US008705955B2

(12) United States Patent
Grobe et al.

(10) Patent No.: US 8,705,955 B2
(45) Date of Patent: Apr. 22, 2014

(54) OPTICAL ACCESS NETWORK, SECONDARY NETWORK SIDE TERMINATION NODE OF AN OPTICAL ACCESS NETWORK, AND METHOD FOR OPERATING A NETWORK SIDE TERMINATION NODE

(75) Inventors: Klaus Grobe, Utting (DE); Joerg-Peters Elbers, Fuerstenfeldbruck (DE)

(73) Assignee: Adva AG Optical Networking (DE)

( * ) Notice: Subject to any disclaimer, the term of this patent is extended or adjusted under 35 U.S.C. 154(b) by 147 days.

(21) Appl. No.: 13/105,303

(22) Filed: May 11, 2011

(65) Prior Publication Data

US 2011/0293265 A1 Dec. 1, 2011

(30) Foreign Application Priority Data

Jun. 1, 2010 (EP) .................... 10005671

(51) Int. Cl.
G02F 1/00 (2006.01)
G02F 2/00 (2006.01)
H01S 3/00 (2006.01)
H04B 10/00 (2013.01)
H04J 14/00 (2006.01)
H04B 10/08 (2011.01)
H04B 17/00 (2006.01)

(52) U.S. Cl.
USPC ..................... 398/16; 398/1; 398/9

(58) Field of Classification Search
CPC ...... H04B 10/03; H04B 10/032; H04B 10/71; H04J 14/0287
USPC ....................................... 398/1–38
See application file for complete search history.

(56) References Cited

U.S. PATENT DOCUMENTS

| H2075 H | * | 8/2003 | Gnauck et al. ................. 398/58 |
|---|---|---|---|
| 7,555,215 B2 | * | 6/2009 | Nakamura et al. .............. 398/72 |
| 2005/0286649 A1 | * | 12/2005 | Redfern ...................... 375/260 |
| 2007/0268818 A1 | | 11/2007 | Sugihara |
| 2008/0124075 A1 | * | 5/2008 | Xu et al. ....................... 398/25 |
| 2008/0131124 A1 | | 6/2008 | Nam et al. |
| 2008/0232794 A1 | | 9/2008 | Absillis et al. |
| 2013/0077633 A1 | * | 3/2013 | Mizutani et al. .............. 370/400 |

FOREIGN PATENT DOCUMENTS

| EP | 1746857 A1 | 1/2007 |
|---|---|---|
| GB | 2433663 A | 6/2007 |
| WO | 2009116904 A1 | 9/2009 |

* cited by examiner

*Primary Examiner* — Leslie Pascal
*Assistant Examiner* — Casey Kretzer
(74) *Attorney, Agent, or Firm* — Donald R. Boys; Central Coast Patent Agency, Inc

(57) ABSTRACT

An optical access network has a first and a second network-side termination node, the first including a first transceiver arrangement connected to a first optical link, configured to send a first signal to a customer side termination node including a transceiver for receiving the first signal, and the second including a second transceiver arrangement connected to a second optical link and configured for sending a second signal to a transceiver of a customer-side termination node via the second link. The transceiver of the customer side termination node has a loopback element emitting a monitoring signal back to the network side termination nodes. Both network-side termination nodes have a link failure detector receiving the monitoring signal.

10 Claims, 6 Drawing Sheets

OPTICAL ACCESS NETWORK, SECONDARY NETWORK SIDE TERMINATION NODE OF AN OPTICAL ACCESS NETWORK, AND METHOD FOR OPERATING A NETWORK SIDE TERMINATION NODE

CROSS-REFERENCE TO RELATED DOCUMENTS

The present application claims priority to EP application 10 005 671.2, filed Jun. 1, 2010, which is incorporated herein in its entirety, at least by reference.

The present invention refers to an optical access network comprising a customer side termination node and a first network side termination node, wherein
the first network side termination node comprises a first transceiver arrangement connected to a first optical link and configured to send a first signal to the customer side termination node via the first link and
the customer side termination node comprises a transceiver for receiving the first signal.

Optical access networks of this kind are known in the art for connecting customer of telecommunication services, such as Internet access and voice services to a core network, in particular a packet-based core network, such as the Internet. For reasons of cost, these networks have as few active components as possible. Typically, only terminating nodes connecting the access network to different networks, such as a core network or customer side networks, have active devices like electronic circuitry or light sources. These optical access networks having active components at the most at their edge but not in their core, are called passive optical networks.

An optical access network has at least one network side termination node which serves to connect the network to a core network and at least one customer side termination node, which serves to connect a terminal or a network of a customer to the access network. However, the customer side termination node may not be directly connected to the customer's network or terminal and a further access system may be applied to connect the customer's terminal or network to the optical access network, i.e. the access network may be used for backhauling first-mile-access traffic which is already aggregated at least to some extent by the further access system. Nevertheless, the customer side termination node may also be co-located with the customer's terminal or network.

Because normally a large number of customers use such an access network simultaneously, the access network must be resilient with respect to link failures. In particular, it is required that a failure of an optical link connected directly to a network side termination node do not disconnect the customer's terminal or network from the core network.

The scientific paper Bo Zhang et al.: "A Survivable WDM Passive Optical Network with Colourless Optical Network Units", Proc. of 11$^{th}$ Optoelectronics and Communications Conference (OECC), 2006 discloses an optical access network of the above-mentioned kind. This optical network provides the required resilience by protection switching. Two optical links, i.e. a pair of working fibers and a pair of protection fibers, are connected to a single network side termination node. If a working fiber breaks, then the network side termination node detects the link failure and triggers an optical switch of the network side termination node to connect to the protection fiber. However, the known access network is not resilient with respect to a failure of the network side termination node.

The object of the present invention is to provide an optical access network and a network side termination node of such a network that allows for a high degree of resilience and can be easily implemented.

This object is solved by an optical access network of the above-mentioned kind that is characterized in that
the access network comprises a second network side termination node comprising a second transceiver arrangement connected to a second optical link and configured for sending a second signal to the customer side termination node via the second link;
the transceiver of the customer side termination node has a loopback element for emitting a monitoring signal via the first link and the second link back to the network side termination nodes for indicating whether the first signal and/or the second signal is present at the customer side termination node; and in that
both network side termination nodes each have a link failure detector for receiving the monitoring signal, detecting a link failure of the first link depending on the monitoring signal and activating or deactivating the transceiver arrangement depending on said detecting.

Instead of using protection switching, the present invention applies a multihoming approach, wherein a single customer side termination node is connected to at least two network side termination nodes. Furthermore, coordination of the network side termination nodes connected to the same customer side termination node is performed by means of the monitoring signal sent via the first and the second link. As a consequence, an additional physical signaling link between the network side termination nodes is not needed to coordinate a switchover from one network side termination node to another network side termination node. Moreover, a breakdown of one network side termination node would not disconnect the customers from the core network. The access network according to the present invention has, therefore, a high degree of availability.

It is preferred that the first network side termination node is a primary termination node, the link failure detector of which is configured to deactivate the transceiver of the first network side termination node, if the link failure detector has detected the link failure. Deactivating the transceiver in case of the link failure prevents the primary termination node from disturbing data communication between the second network side termination node and the customer side termination node.

Moreover, it is preferred that the second network side termination node is a secondary termination node, the link failure detector of which is configured to activate the transceiver of the second network side termination node, if the link failure detector has detected the link failure. In other words, the secondary network side termination node keeps its transceiver in a deactivated state, as long as it has not detected any link failure. In case of a link failure, it activates its transceiver, so that data communication can be performed between the secondary network side termination node and the customer side termination node via the second link.

Deactivating the transceiver may comprise turning off a transmitter of the transceiver. Accordingly, the transceiver arrangement of the first network side termination node and/or the second network side termination node preferably comprises a transmitter coupled with the link failure detector of the same network side termination node, so that the transmitter is turned off, if the transceiver is deactivated.

In a preferred embodiment of the present invention, the access network comprises a remote node, wherein the first link and the second link are connected to the remote node and the customer side termination node is connected to the remote node by means of an optical access link. Preferably, the remote node is a passive remote node comprising passive optical components only. The remote node functions as a concentrator that is usually located on a different place than a central office, where the network side termination node may be installed.

In another embodiment of the present invention, the access network comprises a first remote node and a second remote node, wherein the first link is connected to the first remote node and the second link is connected to the second remote node and the customer side termination node is connected to both remote nodes by means of separate optical access links. This access network has a higher degree of resilience, because a breakdown of a single remote node does not disconnect the customer's core network.

In an embodiment, the access network is based on a single fiber working (SFW) approach, i.e. the first link, the second link and/or the access link comprise a single optical fiber. The single optical fiber is used for data transmission from the core network to the customer side termination node (downstream transmission) as well as for data transmission from the customer side termination node to the network side termination node (upstream transmission).

In another embodiment, the first link, the second link and/or the access link comprises a fiber pair, wherein one fiber of the fiber pair is arranged for data communication in the opposite direction as the other one. One fiber is used for downstream transmission and the other fiber is used for upstream transmission.

Furthermore, it is possible that one part of the optical links have a single optical fiber for upstream and downstream transmission and another part of the links have a fiber pair of one fiber for downstream transmission and another fiber for upstream transmission.

In a preferred embodiment, the monitoring signal comprises a pilot tone, wherein the transceiver arrangement of the first network side termination node and/or the transceiver arrangement of the second network side termination node has a modulator for modulating the first signal and/or the second signal with the pilot tone and the loopback element has a passive reflecting device for emitting the monitoring signal by reflecting the first optical signal and/or the second optical signal. Preferably, the reflecting device has passive components only.

According to another preferred embodiment of the present invention the monitoring signal comprises an upstream data stream, wherein the loopback element has a monitoring transmitter for transmitting the monitoring signal by modulating an optical upstream data signal transmitted from the customer side termination node to the first network termination node via the first optical link and/or to the second network side termination node via the second optical link. In other words, an additional digital signaling channel is established between the customer side termination node and the network side termination nodes that is independent from data transmissions carried out by means of the data signal. This transparent signaling channel is often referred to as Embedded Communication Channel (ECC). In contrast to the above-mentioned embodiment that has the passive reflecting device and therefore a completely passive loopback element, the loopback element of this embodiment comprises active circuitry such as the monitoring transmitter for transmitting the monitoring signal.

In an embodiment, the loopback element comprises both the passive reflecting device as well as the active monitoring transmitter. This leads to a higher degree of availability. If the monitoring transmitter fails then the reflecting device continues emitting the pilot tone by reflecting the first optical signal and/or the second optical signal. Consequently, a coordinated switch-over to the second network side termination node is still possible if the monitoring transmitter fails. Furthermore, the loopback element of one or more customer side termination nodes can initially—when installing the access network or these customer side termination nodes—comprise the passive reflecting device only. At a later date, the loopback element of these costumer side termination nodes can be upgraded with active components, in particular with the monitoring transmitter, in order to establish the signaling channel providing more sophisticated monitoring functions than the pilot tone.

The above-mentioned object of the present invention is also solved by a secondary network side termination node (of an optical access network comprising a customer side termination node and a primary network side termination node, wherein the primary network side termination node comprises a first transceiver arrangement connected to a first optical link and configured to send a first signal to the customer side termination node via the first link and the customer side termination node comprises a transceiver for receiving the first signal;

the secondary network side termination node being characterized in that the secondary network side termination node comprises a second transceiver arrangement connected to a second optical link and configured for sending a second signal to the customer side termination node via the second link; and in that the secondary network side termination node has a link failure detector for receiving a monitoring signal emitted by a loopback element of the transceiver of the customer side termination node via the second link, detecting a link failure of the first link depending on the monitoring signal and activating the transceiver of the secondary network side termination node if it has detected the link failure.

The secondary network side termination node according to the present invention allows for implementing optical networks that have a high degree of resilience due to the multi-homing approach described above. In particular, the secondary network side termination node does not need a physical signaling link to the primary network side termination node for coordinating the switch-over from the primary network side termination node to the secondary network side termination node in case of failure of the first link.

Furthermore, the object is solved by method for operating a network side termination node of an optical access network comprising a customer side termination node, the customer side termination node being configured either as a primary network side termination node or a secondary network side termination node, wherein the customer side termination node comprises a transceiver for receiving a first signal and the method comprises sending an optical signal to the customer side termination node via an optical link connected a transceiver arrangement of the network side termination node;

this method being characterized in that it comprises receiving a monitoring signal emitted by a loopback element of the transceiver of the customer side termination node for emitting a monitoring signal for indicating whether the signal is present at the customer side termination node via the link back to the network side termination node;

detecting a failure of the link depending on the received monitoring signal; and deactivating a transceiver of the transceiver arrangement in case of a link failure if the network side termination node is configured as the primary network side termination node and/or activating the transceiver in case of a link failure if the network side termination node is configured as the secondary network side termination node.

This method allows for operating a network side termination node that is configurable either as a primary or as a secondary network side termination node. This configuration may be performed manually, e.g. by a network operator.

Preferably, the network side termination node is operated in an optical access network according to the present invention, wherein the first network side termination node is configured as the primary network side termination node and the second network side termination node is configured as the secondary network side termination node.

Preferred embodiments and further advantages of the present invention are shown in the figures and described in detail hereinafter.

Figure 1:
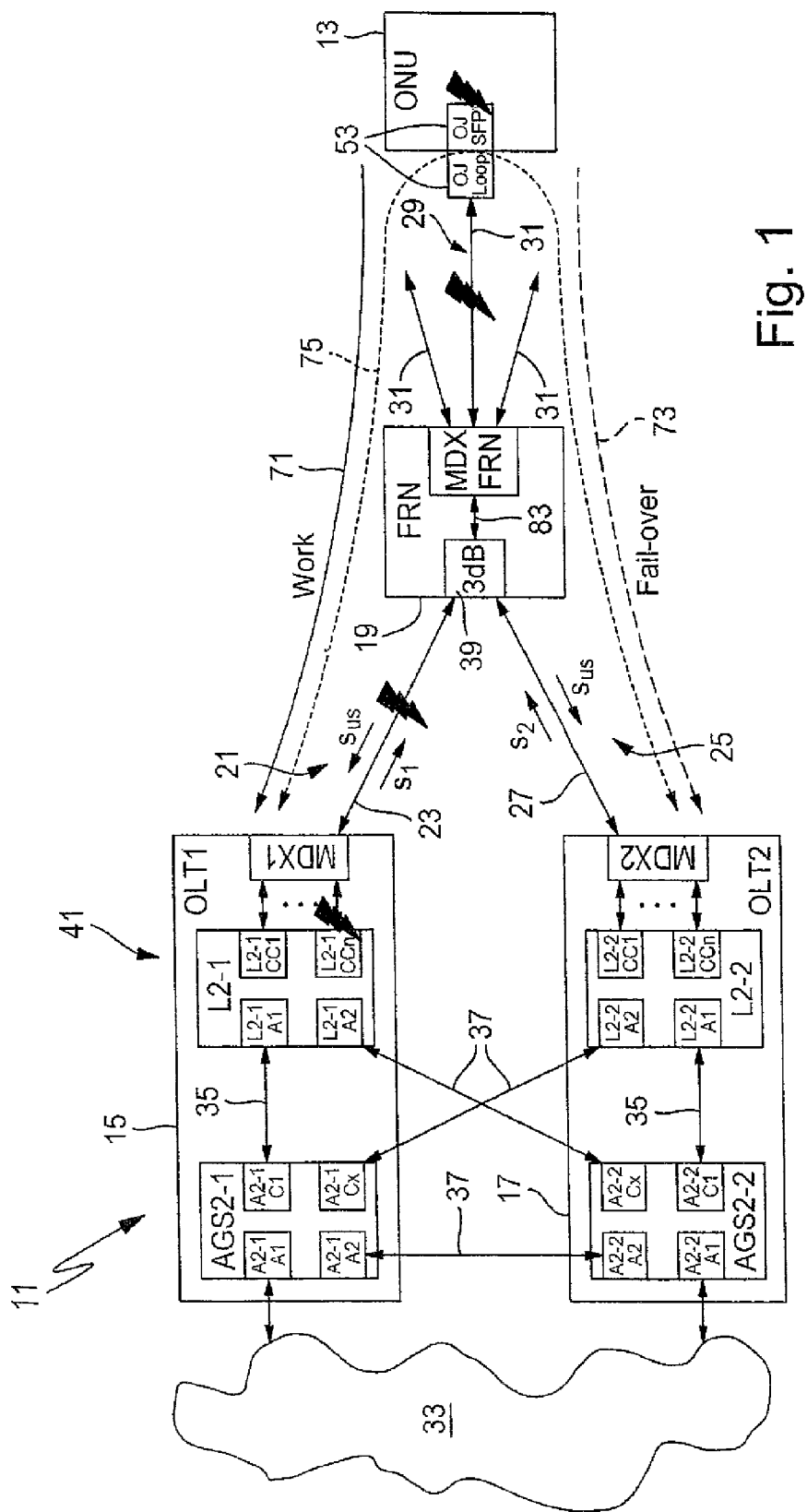
FIG. 1 shows an optical access network according to a first preferred embodiment of the present invention.

An optical access network 11 shown in FIG. 1 comprises multiple customer side network termination nodes 13. For the sake of simplicity, only one customer side termination node 13 is shown. The customer side termination node 13 is also referred to as Optical Network Unit (ONU). Moreover, the access network 11 has a first network side termination node 15 and a second network side termination node 17. The network side termination nodes 15, 17 are also referred to as Optical Line Termination (OLT).

A remote node 19 is arranged between the network side termination nodes 15, 17 and the customer side termination node 13, wherein the first network side termination node 15 is connected to the remote node 19 via a first optical link 21 in the form of a first optical fiber 23. The second network side termination node 17 is connected to the remote node 19 by means of a second optical link 25 consisting of a second fiber 27. The customer side termination node 13 is connected to the remote node 19 by means of an access link 29 consisting of a single access fiber 31. In addition, further access fibers 31 are shown that connect additional customer side termination nodes (not shown) to the remote node 19.

Both network side termination nodes 15, 17 have an aggregation switch AGS2-1, AGS2-2. Ports A2-1 A1, A2-2 A1 are connected by optical links to a core network 33.

Each network side termination node 15, 17 comprises a further switch L2-1, L2-2. A port L2-1 A1, L2-2 A1 is connected by means of an internal link 35 to a port A2-1 C1, A2-2 C1 to the aggregation switch AGS2-1, AGS2-2 of the same network side termination node 15, 17.

The access network 11 comprises interconnection links 37 to connect each further switch L2-1, L2-2 to each aggregation switch AGS2-1, AGS2-2 and to interconnect the aggregation switches AGS2-1, AGS2-2 to each other. In particular, ports A2-1 A2 and A2-2 A2 of aggregation switches AGS2-1, AGS2-2 are connected to each other. Port A2-1 Cx of the aggregation switch AGS2-1 of the first network side termination node 15 is connected to port L2-2 A2 of the further switch L2-2 of the second network side termination node 17. Port A2-2 Cx of aggregation switch AGS2-2 is connected to port L2-1 A2 of further switch L2-1.

The further switch L2-1 of the first network side termination node 15 has multiple optical transceivers L2-1 CC1, L2-1 CCn, wherein each transceiver L2-1 CC1, L2-1 CCn is arranged for transmitting and receiving optical signals in predetermined wavelength, wherein the wavelength of the different transceivers L2-1 CC1, L2-1 CCn differ from each other. The transceivers L2-1 CC1, L2-1 CCn are connected to a mulitplexer-demultiplexer MDX1 of the first network side termination node 15. Accordingly, the further switch L2-2 of the second network side termination node 17 has multiple transceivers L2-2 CC1, L2-2 CCn, the wavelength for transmitting and receiving of which differ from each other. The transceivers L2-2 CC1, L2-2 CCn are connected to a multiplexer-demultiplexer MDX2 of the second network side termination node 17. The multiplexer-demultiplexer MDX1 of the first network side termination node 15 is connected to the first fiber 23. The multiplexer-demultiplexer MDX2 of the second network side termination node 17 is connected to the second fiber 27. The first fiber 23 and the second fiber 27 are connected to a 3 dB-coupler 39 of the remote node 19. A multiplexer-demultiplexer MDX of the remote node 19 is connected to the 3 dB-coupler 39. Furthermore, the access fibers 31 are connected to the multiplexer-demultiplexer MDX of the remote node 19.

Figure 2:
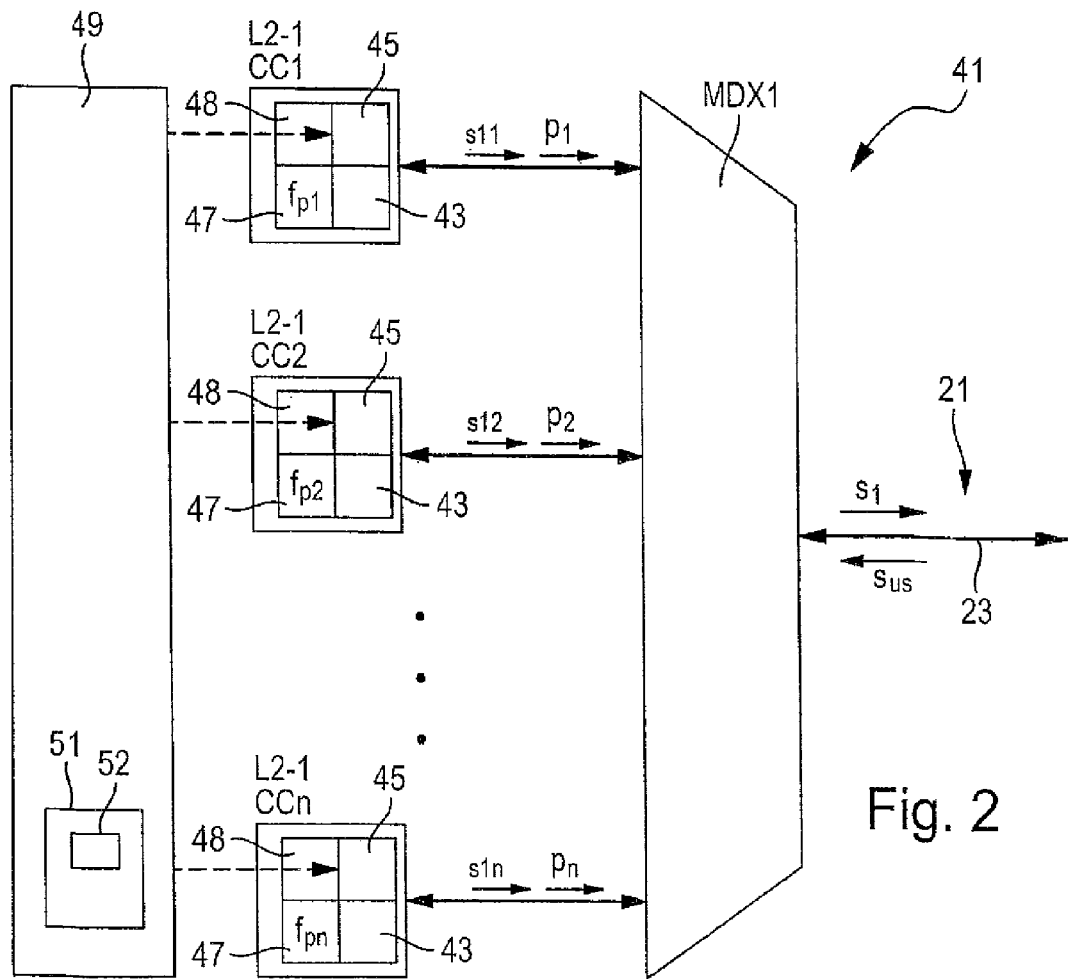
FIG. 2 shows a transceiver arrangement of a network side termination node of the access network shown in FIG. 1.

The transceivers L2-1 CC1, L2-1 CC2, L2-1 CCn and the multiplexer-demultiplexer MDX1 are part of a transceiver arrangement 41 of the first network side termination node 15. FIG. 2 shows this transceiver arrangement 41 in more detail. Each transceiver L2-1 CC1, L2-1 CC2, L2-1 CCn comprises a transmitter 43 and a receiver 45, both connected to the multiplexer-demultiplexer MDX1. In addition, each transceiver L2-1 CC1, L2-1 CC2, L2-1 CCn has a modulator 47 for modulating a first signal $s_1$ carrying payload data to be transmitted to the customer side termination node 13 with a pilot tone.

Moreover, each transceiver L2-C1, L2-1 CC2, L2-1 CCn comprises a monitoring signal detector 48 for detecting a monitoring signal emitted by the customer side termination node 13. The transceiver arrangement comprises a link failure detector 49 for detecting a link failure depending whether the monitoring signal emitted by the customer side termination node 13 has been detected. The link failure detector 49 is coupled to the transceivers L2-C1, L2-1 CC2, L2-1 CCn so that it can deactivate the transceivers L2-1 CC1, L2-1 CC2, L2-1 CCn depending on the detecting of the link failure. In the shown embodiment, the link failure detector 49 is coupled with the transmitters 43 for activating or deactivating the transmitters 43.

The link failure detector 49 further includes a decision unit 51 for determining, whether there is a link failure depending on the monitoring signals emitted by different customer side termination nodes 13. The decision unit 51 has a correlator 52 for correlating information about the presence of the monitoring signals at the individual detectors 48.

The transceivers L2-2 CC1, L2-2 CC2, L2-2 CCn and the multiplexer-demultiplexer MDX2 are part of a transceiver arrangement 41 of the second network side termination node 17. The structure of the transceiver arrangement 41 of the second network side termination node 17 corresponds at least essentially to the structure shown in FIG. 2 and described above.

Figure 3:
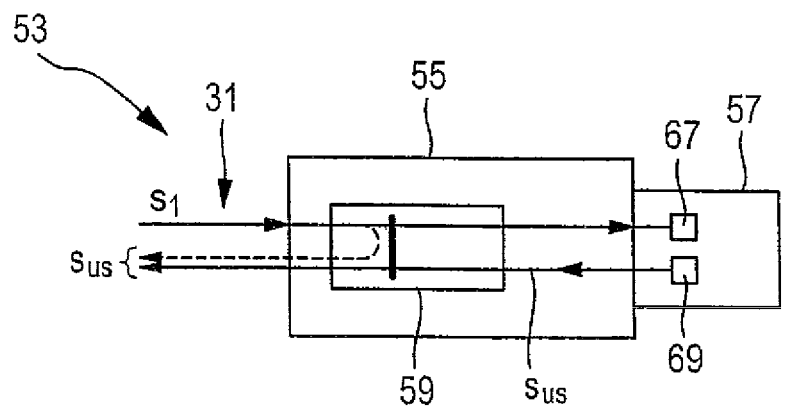
FIG. 3 shows a transceiver of a customer side termination node of the access network shown in FIG. 1.

FIG. 3 shows a transceiver 53 of the customer side termination node 13 in more detail. The transceiver 53 has a loopback element 55 and a transceiver element 57. The loopback element 55 includes a reflecting device 59 which reflects a part of the light incoming from the access fiber 31 back to the access fiber and lets pass the remaining part of the incoming light to a receiver 67 of the transceiver element 57. Light sent by a transmitter 69 of the transceiver element 57 can pass the reflecting device 59 and is coupled into the access fiber 31. The transceiver element 57 may be integrated in a single module, such as a Small Form-factor Pluggable transceiver (SFP); the loopback element 55 may be a separate device connected to and/or attached to the SFP.

When operating the access network 11 data transmissions between the core network 33 and the customer side termination node 13 are normally carried out via the first network side termination node 15, the first link 21, the remote node 19 and the access link 29. The first link 21, the remote node 19 and the access link 29 are part of a work path 71 between the first network side termination node 15 and the customer side termination node 13.

In case of a failure within the transceiver arrangement 41 of the first network side termination node 15 or in case of a failure of the first link 21 the transceiver arrangement 41 of the first network side termination node 15 will be deactivated tearing down the work path 71. In addition, the transceiver arrangement 41 of the second network side termination node 17 will be activated establishing a fail-over path 73 via the second optical link 25, the remote node 19 and the access link 29. Data communication between the core network 33 and the customer side termination node 13 is then performed via the second network side termination node 17, the second link 25, the remote node 19 and the access link 29. Because the first network side termination node 15 performs the data transmissions between the core network 33 and the customer side termination node 13 under normal conditions—i.e. if there is no failure in the first link 21 or the transceiver arrangement 41 of the first network side termination node 15—the first network side termination node 15 functions as a primary network side termination node. In case of the link failure or the failure of the transceiver arrangement 41 of the first network side termination node 15 the second network side termination node 17 takes over the data communication between the core network 33 and the customer side termination node 13 by establishing the fail-over path 73. I.e., the second network side termination node 17 functions as a secondary network side termination node.

Switching over from the work path 71 to the fail-over path 73 requires both network side termination nodes 13, 15 be coordinated. Instead of using a dedicated signaling link between both network side termination nodes 15, 17, coordination is performed via the transceiver 53 of the customer side termination node 13. Accordingly, a signaling path 75 for coordinating both network side termination nodes 15, 17 is going through the transceiver 53.

The coordination of the network side termination nodes 13, 15 is carried out as follows. In case of no failure the transceiver arrangement 41 of the second network side termination node 17 is deactivated, i.e. the transmitters 43 of the second network side termination node 17 are not working. However, the transceiver arrangement 41 of the first network side termination node 15 is activated and the corresponding transmitters 43 are working and emitting an optical signal $s_1$ for data transmission to the customer side termination node 13 via the first link 21. In addition, modulator 47 modulates the first optical signal $s_1$ with a pilot tone p so that the first optical signal $s_1$ does not only contain payload data to be transmitted to the customer side termination node 13, but also the pilot tone p. In the shown embodiment each modulator 47 generates a pilot tone of a specific frequency $f_{p1} \neq f_{p2} \neq \ldots \neq f_{pn}$. In another embodiment, each modulator 47 has the same pilot tone frequency $f_{p1} = f_{p2} = \ldots = f_{pn}$, i.e. the pilot tones generated by the transceivers L2-1 CC1, L2-1 CC2 . . . , L2-1 CCn are at least essentially identical.

The first optical signal $s_1$ emitted by a certain transmitter 43 has a specific wavelength $\lambda_1, \lambda_2, \ldots \lambda_n$, corresponding to a specific Wavelength Division Multiplex (WDM) channel CC1, CC2, . . . CCn and assigned to a single customer side termination node 13. The multiplexer-demultiplexer MDX1 passes the signals $s_{s11}, s_{s12}, \ldots s_{1n}$ to the first optical link 21. As a consequence, the first optical signal $s_1$ output by the transceiver arrangement 41 is a WDM signal.

The first optical signal $s_1$ is going through the first fiber 23 of the first link 21 and passed through the 3 dB-coupler 39 and the multiplexer-demultiplexer MDX of the remote node 19 and the access fiber 31 of the access link 29 and finally reaches the transceiver 53 of the customer side termination node 13.

As shown in FIG. 3, the reflecting device 59 reflects a part of the power of the first optical signal $s_1$ back to the access fiber 31 and passes the remaining part of the power of the access signal $s_1$ to the receiver 67 of the transceiver element 57. The transceiver element 57 processes the first optical signal $s_1$ without taking into account the pilot tone p, because the receiver 67 is not sensitive to the pilot tone p modulated upon the first optical signal $s_1$. The transmitter 69 of the transceiver element 57 is transmitting an upstream data signal $s_{us}$ carrying payload data and being superimposed with the reflected part of the first optical signal $s_1$.

The upstream signal $s_{us}$ is passed via the access fiber 31, the remote node 19 and the first fiber 23 back to the transceiver arrangement 41 of the first network side termination node 15. Furthermore, the upstream signal $s_{us}$ is passed via the second fiber 27 to the transceiver arrangement 41 of the second network side termination node 17, because 3 dB-coupler 39 of the remote node 19 subdivides the power of the upstream signal $s_{us}$ into two signals fed into the first fiber 23 and the second fiber 27, respectively.

The transceiver arrangements 41 of both network side termination nodes 15, 17 receive the upstream signal $s_{us}$. The multiplexer-demultiplexer MDX1 distributes the upstream signals $s_{us}$ generated by the individual customer side termination nodes 13 to the transceivers L2-1 CC1, L2-1 CC2 . . . , L2-1 CCn, L2-2 CC1, L2-2 CC2 . . . , L2-2 CCn. The receivers 45 receive and process the upstream signal $s_{us}$, e.g. by extracting payload data frames from the upstream signal $s_{us}$ and passing them to digital switching circuitry of the corresponding switch L2-1, L2-2.

Furthermore, the monitoring signal detectors 48 detect the monitoring signal comprising the pilot tone. To this end, the monitoring signal detector 48 may comprise a lock-in amplifier adapted to the known frequency $f_{p1}, f_{p2}, \ldots, f_{pn}$ of the pilot tone p generated by the corresponding modulator 47. Applying the lock-in amplifier allows for detecting the pilot tone p, even if it is heavily attenuated. In some cases the attenuation of the pilot tone is in a range of 50 to 60 dB.

The monitoring signal detectors 48 signal to the decision unit 51, whether they have detected the pilot tone p belonging to a certain customer side termination node 13. The decision unit 51 decides based on the signaling of the monitor signal detectors 48, whether the first optical link 21 is defective. The decision unit 51 may comprise the correlator 52 to correlate the information about the presence of the pilot tone p at the individual monitoring signal detectors 48. For instance, the decision unit 51 may decide the first link 21 to be defective, if a certain number of pilot tones p is not detected by the corresponding monitoring signal detectors 48. This allows for distinguishing between the failure of the first optical link 21 and a failure of the access link 29. If an access link 29 is cut, then normally only one pilot tone p will not arrive at the transceiver arrangement 41. However, if the first link 21 is defective, then no pilot tone p will be present at the multiplexer arrangement 41.

Furthermore, the receivers 45 signal to the decision unit 51, whether the upstream signal $s_{us}$ is present regardless of whether the upstream signal $s_{us}$ contains the pilot tone p or not.

If the access network 11 is not defective at all, then both network side termination nodes 15, 17 detect that the upstream signal $s_{us}$ generated by all customer side termination nodes 13 is present. The decision unit 51 of both network side termination nodes 15, 17 decides that there is no failure on the first link 21. As a consequence, the link failure detector 49 of the first (primary) network side termination node 15 controls the transceiver arrangement 41 of that customer side termination node 13, so as to keep the transmitters 43 active. The link failure detector 49 of the second (secondary) network side termination node 15 controls the transceiver arrangement 41 of that network side termination node 15, so as the transmitters 43 are in a deactivated state. Thus, data transmissions between the core network 33 and the customer side termination node 13 is performed via the first network side termination node 15, i.e. along the work path 71.

In case of a failure of the first optical link 21, no upstream signal $s_{us}$ of any customer side termination node 13 arrives at the transceiver arrangement 41 of the first network side termination node 13. Thus, the receivers 45 signal to the decision unit 51 of that network side termination node 13 that no upstream signal $s_{us}$ is present. Furthermore, the monitor signal detectors 48 signal to the decision unit 51 that the monitoring signal, i.e. the pilot tone p, is not present. The decision unit 51 of the first network side termination node 15 is arranged for deactivating the transceivers L2-1 CC1, L2-1 CC2, . . . L2-1 CCn, if no upstream signal $s_{us}$ is detected. Therefore, the transmitters 43 of the first network side termination node 15 are deactivated.

Due to the failure of the first optical link 21 the pilot tone p does not arrive at the loopback element 55 of the customer side termination nodes 13. However, the transmitters 69 continue emitting the upstream signal $s_{us}$. Thus, the transceiver arrangement 41 of the second network side termination node 17 receives the upstream signal $s_{us}$ without the pilot tone p. As a consequence, the receivers 45 signal to the decision unit 51 that the upstream signal $s_{us}$ is present. However, the monitoring signal detectors 48 signal to the decision unit 51 that the pilot tone p is missing. The link failure detector 49 being configured to activate the transceivers L2-2 CC1, L2-2 CC2, . . . , L2-2 CCn, if the upstream signal $s_{us}$, but not the pilot tone p is detected, controls the transceiver arrangement 41 to activate the transmitters 43 for transmitting a second optical signal $s_2$ via the second link 25. Therefore, data communication between the core network 33 and the customer side termination node 13 is directed over the fail-over path 73.

The switches AGS2-1, L2-1, AGS2-2, L2-2 are fully meshed among each other. This allows for passing traffic directed over the fail-over path 73 via the aggregation switch AGS2-1 of the first network side termination node 15, such that the switchover from the work path 71 to the fail-over path 73 is transparent with regard to the core network 33. This allows for a fast switchover from the work path 71 to the fail-over path 73, because routing, especially within the core network 33, needs not to be adapted to the fail-over path 73.

Figure 4:
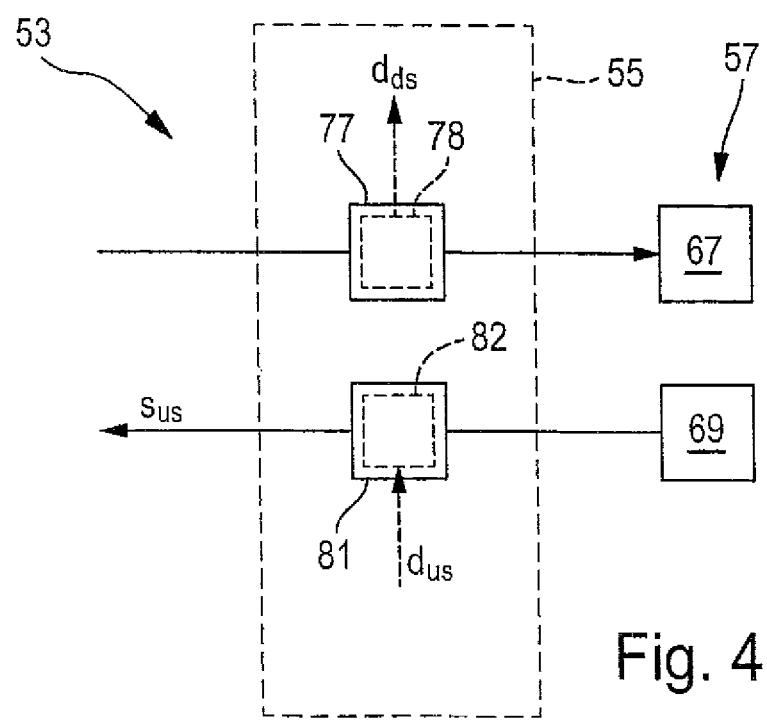
FIG. 4 shows a transceiver of a customer side termination node according to a second preferred embodiment.

In a different embodiment, as shown in FIG. 4, the loopback element 55 of the transceiver 53 comprises a monitoring receiver 77 for receiving the monitoring signal and a monitoring demodulator 78 for demodulating a downstream data stream $d_{ds}$ modulated onto the first optical signal. Moreover, the loopback element 55 comprises a monitoring transmitter 81 having a monitoring modulator 82 for modulating the upstream signal $s_{us}$ with an upstream data stream $d_{us}$ generated by the customer side network termination node 13. Accordingly, the modulator 47 of the transceiver arrangement 41 is arranged for modulating the first signal $s_1$ with the downstream data stream $d_{ds}$ generated by the corresponding network side termination node 15, 17. The monitoring signal detector 48 is arranged for detecting and demodulating the upstream data stream $d_{us}$ generated by the customer side network termination node 13. The whole transceiver 53 including the loopback element 55 and the transceiver element 57 may be integrated in a single device, such as a Small Form-factor Pluggable transceiver (SFP).

When operating the access network 11 according to this embodiment, the data streams $d_{us}$, $d_{ds}$ provide a bi-directional signaling channel between the activated transceiver arrangement 41 and the transceiver 53 of the customer side termination node 13. This signaling channel being transparent with respect to the payload data communication between the transmitter 43 and the receiver 67 as well as the transmitter 69 and the receiver 45 is also called embedded communication channel (ECC). If a failure on the first link 21 occurs, then the transceiver 53 does not get the first optical signal $s_1$. Therefore, the monitoring transmitter 81 generates a sequence within the upstream data stream $d_{us}$ in order to indicate the lack of the first optical signal $s_1$. The monitoring signal detectors 48 will receive this indication and signal to the decision unit 51 that the first signal $s_1$ is missing. Basically, in this embodiment the signaling channel consisting of the upstream data stream $d_{us}$ and the downstream data stream $d_{ds}$ is applied for coordinating the network side termination nodes 15, 17 instead of the pilot tone p.

If there is a failure in the first link 21, the first network side termination node 15 does not receive any signal and deactivates the transceivers L2-1 CC1, L2-1 CC2, . . . , L2-1 CCn, in particular the transmitters 43. If the second network side termination node 17 detects that the upstream signal $s_{us}$ is present, but the upstream data stream $d_{us}$ signals that the customer side termination node 13 does not see any first optical signal, then the second network side termination node 17 activates its transceivers L2-2 CC1, L2-2 CC2, . . . , L2-2 CCn, in particular the transmitters 43, and starts transmitting the second signal $s_2$ via the second link 25. Thus, data communication can be carried out via the fail-over path 73.

Furthermore, in both above-described embodiments, a switchover from the work path 71 to the fail-over path 73 is also triggered, when a certain number of receivers 45 and/or transmitters 43 fail. If a receiver 45 of the active first network side termination node 15 fails, then it cannot detect the upstream signal $s_{us}$ any more and signals to the decision unit 51 that the upstream signal $s_{us}$ is missing. The correlator 52 correlates the indications of missing upstream signals $s_{us}$ originating from the different receivers 45. The link failure detector 49 decides to deactivate the transceiver arrangement 41 depending on the correlating performed by the correlator

52. Preferably, the transceiver arrangement 41 will be deactivated, if a certain number of receivers 45 indicate that the upstream signal $s_{us}$ is missing.

After the transceiver arrangement 41 of the first network side termination node 15 has deactivated itself, no first optical signal $s_1$ is generated any more. As a consequence, the monitoring signal detectors 48 of the second network side termination node 17 detect the lack of the pilot tone p or a corresponding indication within the upstream data stream $d_{us}$ and signal this to the decision unit 51. The link failure detector 49 activates the transceiver arrangement 41 of the second network side termination node 17 based on this signaling. Preferably, the transceiver arrangement 41 is activated, if a certain number of monitoring signal detectors 48 have signaled that the pilot tone is missing or that a missing first optical signal $s_1$ at the transceiver 53 of the customer side termination node 13 has been detected.

In case of a failure of the transmitter 43 the transceiver 53 of the customer side termination node 13 does not get the first optical signal $s_1$. According to the embodiment that is based on the pilot tone p, the transceiver arrangement 41 of the second network side termination node 17 gets the upstream signal $s_{us}$, but no pilot tone p. According to the embodiment based on the signaling channel built up by the data streams $d_{us}, d_{ds}$, the monitoring transmitter 81 sends an indication that the corresponding transceiver 53 does not get the first optical signal $s_1$ by embedding appropriate bit sequence into the upstream data stream $d_{us}$. The monitoring signal detector 48 detects the lack of the pilot tone p or the indication within the upstream data stream $d_{us}$, respectively. The monitor signal detectors 48 signal this to the correlator 52 and the decision unit 51 decides by correlating these indications got from the monitor signal detectors 48, whether there is a link failure. If the decision unit 51 has decided that there is a link failure, then the link failure detector 49 will activate the transceivers L2-2 CC1, L2-2 CC2, . . . , L2-2 CCn and data transmissions between the core network 33 and the customer side termination node 13 can be carried out over the fail-over path 73.

Figure 5:
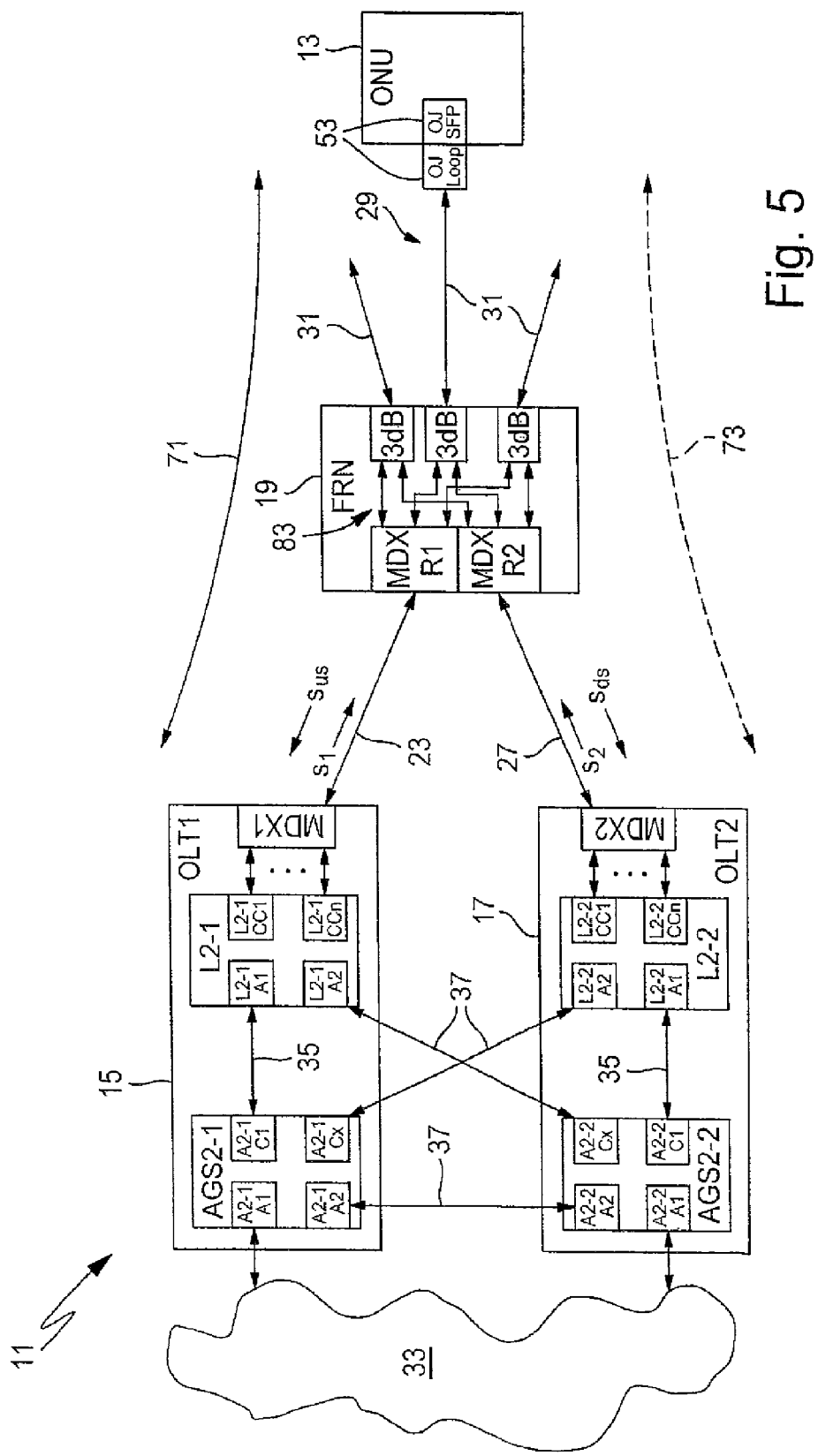
FIG. 5 shows an optical access network according to a third preferred embodiment.

FIG. 5 shows an access network 11 according to a further embodiment that differs from the access network depicted in FIG. 1 in that the remote node 19 has two multiplexer-demultiplexers MDX R1, MDX R2 and in that the 3 dB-couplers 39 are connected with the access fibers 31 and not with the first fiber 23 and the second fiber 27. Using two multiplexer-demultiplexers MDX R1, MDX R2 instead of one leads to redundancy with regard to internal fibers 83 of the remote node 19. If a single fiber is cut or removed from the remote node 19, then the customer side termination node 13 is not disconnected from the core network 33. Depending on which internal fiber 83 is defective, disconnected or removed, a switchover from the work path 71 to the fail-over path 73 will occur. Therefore, the remote node 19 shown in FIG. 5 is more robust with regard to operating errors of technical personal that is performing maintenance work. If one of the internal fibers 83 is accidentally removed, then the access network 11 will continue operating correctly.

Figure 6:
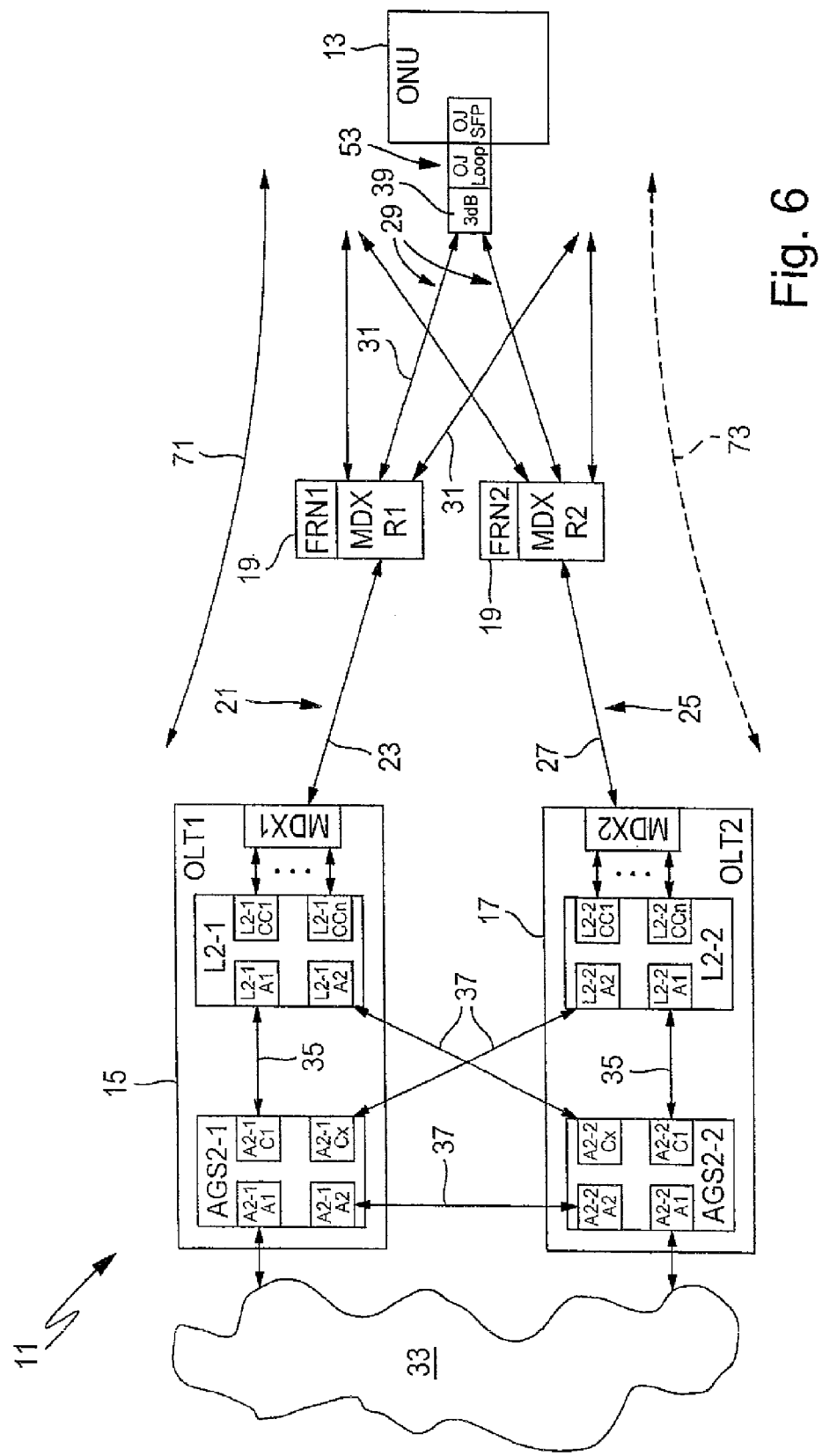
FIG. 6 shows an optical access network according to a fourth preferred embodiment.

FIG. 6 shows an access network 11 according to yet another embodiment. In this access network 11 a single customer side termination node 13 is connected by separate access links 29 to two different remote nodes. The 3 dB-coupler 39 is part of the customer side termination node 13.

Figure 7:
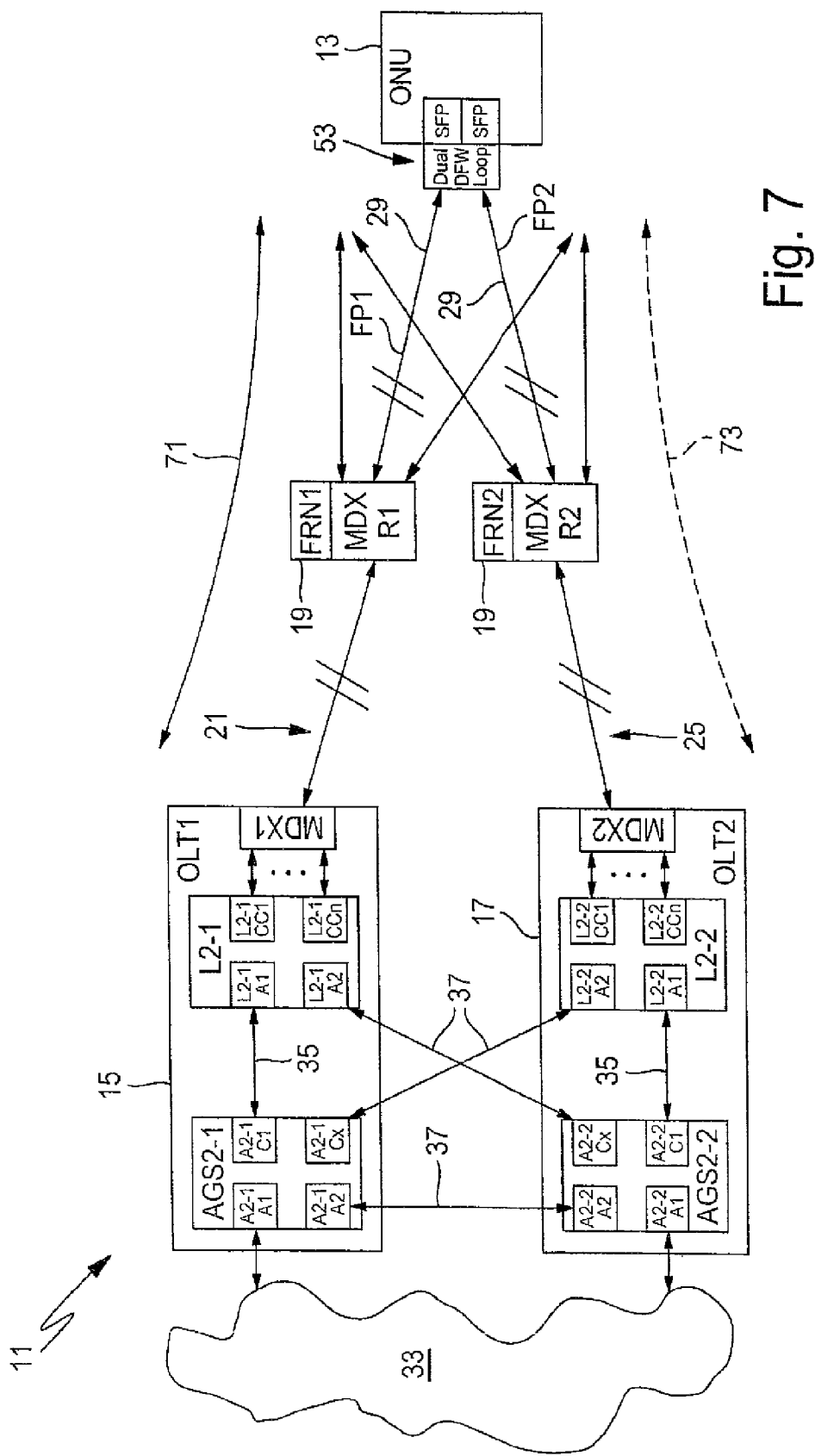
FIG. 7 shows an optical access network to a fifth preferred embodiment of the present invention.

In yet another embodiment of the communication network 11 shown in FIG. 7, the first optical link 21, the second optical link 25 and the access link 29 consist of a fiber pair, whereas the links 21, 25, 29 according to the above-described embodiments consist of a single fiber only (single fiber working, SFW). In particular, one fiber of each fiber pairs 21, 25, 29 is dedicated for downstream transmissions and the other fiber of the fiber pair 21, 25, 29 is dedicated to upstream data transmission.

Figure 8:
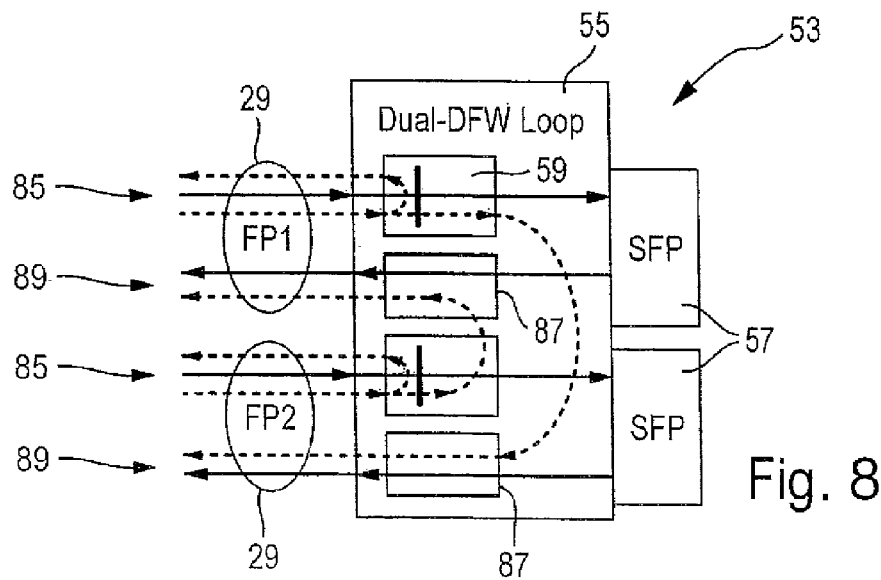
FIG. 8 shows a transceiver of the customer side termination node of the access network shown in FIG. 7.

FIG. 8 shows the transceiver 53 of the customer side termination node 13 in more detail. A first fiber pair FP1 of the first access link 29 is connected to one remote node 19 and a second fiber pair FP2 of the second access link 29 is connected to another remote node 19. A downstream fiber 85 of each fiber pair FP1, FP2 is connected to a reflecting device 59 of the loopback element 55. Moreover, the loopback element 55 has two coupling devices 87, wherein each coupling device is connected to an upstream fiber 89 of each fiber pair FP1, FP2. The loopback element 55 is arranged to reflect a part of the energy of the first signal received from a given downstream fiber 85 back into the same downstream fiber 85. Furthermore, the reflecting device 59 of one fiber pair FP1, FP2 is coupled with the coupling device 87 of the other fiber pair FP2, FP1 such that a part of the power of downstream signal $s_1$ is passed to the upstream fiber 89 of that coupling device 87 too.

The transceiver 53 has two transceiver elements 57, wherein each transceiver element 57 is connected to one fiber pair FP1, FP2.

When operating the access network 11 and if there is no failure, then the transceiver arrangement 41 of the first network side termination node 15 is activated and the customer side termination node 13 uses the transceiver element 57 connected to fiber pair FP1 to communicate via the first fiber pair and the first network side termination node with the core network 33. If there is a failure in the first link 21 or the first fiber pair FP1, then a switchover from work path 71 to fail-over path 73 will be performed and the customer side termination node 13 uses the transceiver element 57 connected to fiber pair FP2 in order to communicate with the core network 33 via the fail-over path 73 and the second network side termination node 17. The function of the network side termination nodes 15, 17 in this dual-fiber scenario corresponds to the function of the network side termination nodes 15, 17 described above. If there is no failure in the access network, then both network side termination nodes 15, 17 receive the pilot tone p. Thus, the first network side termination node 15 will stay activated and the second network side termination node 17 will stay deactivated. Either if there is a failure in a downstream fiber of the first link 21 or the first fiber pair FP1, then the transceiver arrangement 41 of the first network side termination node 15 does not receive any pilot tones p any more and deactivates itself. The transceiver arrangement 41 of the second network side termination node 17 sees the upstream signal $s_{us}$, but cannot detect any pilot tone p. Therefore, the transceiver arrangement 41 of the second network side termination node 17 is activated and data transmissions between the core network 33 and the customer side termination node 13 can be performed along the fail-over path 73.

If an upstream fiber of the first link 21 or the first fiber pair FP1 is defective, then the transceiver arrangement 41 of the first network side termination node 15 does not see any upstream signal $s_{us}$ anymore and deactivates the transmitters 43. The transceiver arrangement 41 of the second network side termination node 17 sees an upstream data signal that does not contain any pilot tone p, because the transmitters 43 of the transceiver arrangement of the first network side termination node 15 are deactivated. Thus, the transceiver arrangement 41 of the second network side termination node 17 deactivates the transmitters 43, so that data communication via the fail-over path 73 is possible.

In another embodiment, the transceiver 53 is arranged to receive the downstream data stream $d_{ds}$ and to transmit the upstream data stream $d_{us}$ instead of reflecting the first optical signal $s_1$. To this end, the transceiver 53 has two pairs of a monitoring receiver 77 and a monitoring transmitter 81, wherein each pair is assigned to one fiber pair FP1, FP2, such that the transceiver 53 can receive the downstream data stream from the downstream fiber 85 of each fiber pair FP1, FP2 and transmit the upstream data stream $d_{us}$ over the upstream fiber 89 of each fiber pair FP1, FP2. If the transceiver 53 detects a link failure or a missing downstream data stream $d_{ds}$ on one downstream fiber 85, it indicates this over both upstream fibers 89 of both fiber pairs FP1, FP2.

If a downstream fiber 85 of the first link 21 or fiber pair FP1 is defective, then the customer side termination node 13 does not see any first optical signal any more and indicates this to both network side termination nodes 15, 17 by means of the upstream data stream $d_{us}$. If the first network side termination node 15 receives this indication, it turns off its transceiver arrangement 41. If the second network side termination node 19 receives this indication, it activates its transceiver arrangement 41 by turning on the transmitters 43.

If an upstream fiber of the first link 21 or the first fiber pair FP1 is defective, then the transceiver arrangement 41 of the first network side termination node 15 does not see any upstream signal $s_{us}$ and deactivates itself. As a consequence, the customer side termination node 13 does not see any first optical signal $s_1$ any more and signals this via the upstream data stream $d_{us}$ to the second network side termination node 17. Then the second network side termination node 17 activates its transceiver arrangement 41 and data transmissions between the core network 33 and the customer side termination node 13 can be performed via the fail-over path 73.

Furthermore, in all described embodiments, the network side termination nodes 15, 17 may react to failures of the transceiver 53 of the customer side termination node 13. For example, if receiver 67 of the transceiver 53 is defective, the customer side termination node 13 may totally deactivate its transmitter 69, so that no upstream signal $s_{us}$ will arrive at any network side termination node 15, 17. In this case, at least the first network side termination node 15 deactivates the transceiver L2-1 CC1, L2-1 CC2, ..., L2-1 CCn assigned to the respective customer side termination node 13. In an embodiment that has the data streams $d_{us}$ and $d_{ds}$ the customer side termination node 13 may signal the failure of its receiver 67 explicitly by means of the upstream data stream $d_{us}$.

If a transmitter 69 of a customer side termination node 13 is defective, then the receiver 45 of the corresponding transceiver arrangements 41 does not receive any upstream signal $s_{us}$ anymore. Therefore, the respective transceivers of both network side termination nodes 15, 17 are deactivated. In embodiments that use the signaling data streams $d_{us}$, $d_{ds}$ the customer side termination node 13 can announce an upcoming failure of the transmitter 69 by sending a special bit sequence or signaling message over the upstream data stream $d_{us}$. This sequence or message is usually called "dying gasp". In particular, the dying gasp signaling over the upstream data stream $d_{us}$ may be applied, if the power supply of the customer side termination node 13 is interrupted and the customer side termination node 13 has enough power available to generate the dying gasp before shutting down. If the first network side termination node receives that dying gasp, then it turns off the respective receiver L2-1 CC1, L2-1 CC2, ..., L2-1 CCn.

The above-described exemplary embodiments refer to dual-homing. However, the customer side termination node may also be assigned to more than two network side termination nodes 15, 17. In other words, the present invention can also be applied in connection with general multihoming scenarios and is not limited to dual-homing. For instance, if three network side termination nodes shall be assigned to a single customer side termination node 13, then the 3 dB-couplers 39 shown in the figures can be replaced by couplers that allow for splitting or and/or combining a single fiber into three fibers connected to three different network side termination nodes or remote nodes. In addition, the transceiver 53 shown in FIG. 8 can be extended such that three fiber pairs can be attached to the customer side termination node 13. Such an extended transceiver 53 reflects the signal which it receives from the downstream fiber 85 of one fiber pair into this downstream fiber 85 and the upstream fibers 89 of all other fiber pairs.

When applying multihoming with more than two network side termination nodes, there are more than one secondary network side termination node. In order to prevent the secondary network side termination nodes 17 from activating their transceivers at the same time, a specific predetermined activation delay may be assigned to each secondary network side termination node 17, wherein the activation delay begins when the link failure is detected. A secondary network side termination node activates its transceiver after it has detected the link failure and the activation delay has passed. If the first access link 21 is defective, then the secondary network side termination node 17 that has the shortest activation delay and the second link 25 of which is not defective, will be activated. As soon as one secondary network side termination node 17 has activated its transceivers it may generate a pilot tone or an appropriate downstream data stream $d_{ds}$ to prevent the other secondary network side termination nodes 17 from activating their transceivers. This access network has a better availability because it continues operating even when two links connected to different network side termination nodes that are assigned to the same customer side termination node are defective.

To sum up, the present invention suggests a multihoming approach to achieve a high grade of resilience in a passive optical access network 11, which can be implemented without the need of additional physical signaling links between network side termination nodes 15, 17.

The invention claimed is:
1. An optical access network comprising:
a first network side termination node comprising a first transceiver arrangement, including a first modulator, coupled to a first optical link comprising at least one optical fiber and sending, when the first network side termination node is active, a first data signal and a first pilot tone of a first specific wavelength generated by the modulator via the first optical link, the first network side termination node further comprising a first link failure detector tuned to the pilot tone;
a second network side termination node comprising a second transceiver arrangement, including a second modulator, connected to a second optical link comprising at least one optical fiber and sending, when the second network side termination node is active, a second data signal and a second pilot tone of a second specific wavelength generated by the second modulator via the second optical link, the second network side termination node further comprising a second link failure detector tuned to the first pilot tone;
a customer side termination node having a transceiver and a reflecting mechanism coupled to a third optical link, comprising at least one optical fiber; and
a remote node between the customer side termination node and the network side termination nodes, the remote node coupled to the first, the second and the third optical links;

wherein, with the first network side termination node active, the first data signal modulated with the pilot tone is sent via the first optical link to the remote node, and thence via the third optical link to the customer side termination node, where the reflector mechanism reflects a portion of at least the pilot tone back into the third optical link, thence to the remote node, and from the remote node via the first optical link back to the first network side termination node, where the first link failure detector senses the presence or absence of the pilot tone, and in the absence of the pilot tone, indicating a link failure in the path between the first network side termination node and the customer side termination node, deactivates the transceiver arrangement of the first network side termination node.

2. The access network according to claim 1, wherein the link failure detector of the second network side termination node, detecting the absence of the first pilot tone, activates the transceiver arrangement of the second network side termination node, making the second network side termination node active.

3. The access network according to claim 1, wherein the first transceiver arrangement of the first network side termination node and the transceiver arrangement of the second network side termination node each comprise a transmitter coupled with the link failure detector of the same network side termination node so that the transmitter is turned off if the transceiver arrangement is deactivated, and turned on if the transceiver arrangement is deactivated.

4. The access network according to claim 1, wherein the first link, the second link the third link comprise a single optical fiber.

5. The access network according to claim 1, wherein the first link, the second link and the third link comprise fiber pairs, wherein the two fibers of each fiber pair are arranged for data communication in opposite directions.

6. A method comprising steps of:
(a) sending, by a transceiver arrangement of a first active network side termination node via a first optical link comprising at least one optical fiber, a first data signal and a first pilot tone of a first specific wavelength generated by a modulator;
(b) receiving the first data signal and first pilot tone at a remote node and sending the first data signal and first pilot tone to a customer side termination node via a third data link comprising at least one optical fiber;
(c) receiving the first data signal and first pilot tone at a transceiver of the customer side termination node, and reflecting a portion of at least the pilot tone back into the third data link by a reflector mechanism;
(d) receiving the reflected pilot tone at the remote node, and sending the reflected pilot tone via the first data link back to the first network side termination node;
(e) receiving the reflected pilot tone at a first link failure detector at the first network side termination node, the link failure detector tuned to recognize the first pilot tone, and determining by the link failure detector presence or absence of the pilot tone;
(f) deactivating the transceiver arrangement of the first network side termination node in absence of the reflected pilot tone, indicating a failure of a link between the first network side termination node and the customer side termination node.

7. The method of claim 6, further comprising steps:
(g) sending the reflected pilot tone via a second data link comprising at least one optical fiber to a second network side termination node;
(h) receiving the reflected data signal at a second link failure detector at the second network side termination node, the second link failure detector tuned to recognize the first pilot tone, and determining by the link failure detector presence or absence of the pilot tone; and
(i) activating a second transceiver arrangement of the second network side termination node in absence of the reflected pilot tone.

8. The method of claim 6 comprising steps for turning on and off a transmitter of either network side termination node when the transceiver arrangement of that network side termination node is activated or deactivated.

9. The method of claim 6 wherein the first link, the second link and the third link comprise a single optical fiber.

10. The method of claim 6 wherein the first link, the second link and the third link comprise fiber pairs, wherein the two fibers of each fiber pair are arranged for data communication in opposite directions.

* * * * *